(12) United States Patent
Gao et al.

(10) Patent No.: US 11,679,983 B2
(45) Date of Patent: Jun. 20, 2023

(54) SUPER-FLEXIBLE HIGH THERMAL CONDUCTIVE GRAPHEME FILM AND PREPARATION METHOD THEREOF

(71) Applicant: ZHEJIANG UNIVERSITY, Zhejiang (CN)

(72) Inventors: Chao Gao, Zhejiang (CN); Li Peng, Zhejiang (CN); Yanqiu Jiang, Zhejiang (CN); Yingjun Liu, Zhejiang (CN)

( * ) Notice: Subject to any disclaimer, the term of this patent is extended or adjusted under 35 U.S.C. 154(b) by 873 days.

(21) Appl. No.: 16/070,449

(22) PCT Filed: Jul. 20, 2016

(86) PCT No.: PCT/CN2016/090635
§ 371 (c)(1),
(2) Date: Jul. 16, 2018

(87) PCT Pub. No.: WO2017/128648
PCT Pub. Date: Aug. 3, 2017

(65) Prior Publication Data
US 2019/0023575 A1    Jan. 24, 2019

(30) Foreign Application Priority Data

Jan. 25, 2016   (CN) .......................... 201610047646.4

(51) Int. Cl.
*B32B 9/00* (2006.01)
*C01B 32/192* (2017.01)
*C01B 32/198* (2017.01)

(52) U.S. Cl.
CPC .......... *C01B 32/192* (2017.08); *C01B 32/198* (2017.08); *C01B 2204/04* (2013.01); *C01B 2204/24* (2013.01); *C01B 2204/26* (2013.01); *C01P 2002/82* (2013.01); *C01P 2004/03* (2013.01); *C01P 2006/10* (2013.01); *C01P 2006/32* (2013.01)

(58) Field of Classification Search
CPC ....... Y10T 428/30; B32B 9/007; B82Y 30/00; C01B 2204/00; C01B 31/0438; C01B 31/0446
USPC .......................................... 428/408; 423/448
See application file for complete search history.

(56) References Cited

U.S. PATENT DOCUMENTS

2011/0101554 A1*  5/2011  Krishnaiah ............ B82Y 30/00
                                                    264/29.1
2012/0070612 A1*  3/2012  Lee ......................... H01B 1/04
                                                    428/141

(Continued)

*Primary Examiner* — Daniel H Miller

(57) ABSTRACT

A super-flexible high thermal conductive graphene film and a preparation method thereof are provided. The graphene film is obtained from ultra large homogeneous graphene sheets through processes of solution film-forming, chemical reduction, high temperature reduction, high pressure suppression and so on. The graphene film has a density in a range of 1.93 to 2.11 g/cm³, is formed by overlapping planar oriented graphene sheets with an average size of more than 100 μm with each other through π-π conjugate action, and comprises 1 to 4 layers of graphene sheets which have few defects. The graphene film can be repeatedly bent for 1200 times or more, with elongation at break of 12-18%, electric conductivity of 8000-10600 S/cm, thermal conductivity of 1800-2600 W/mK, and can be used as a highly flexible thermal conductive device.

6 Claims, 5 Drawing Sheets

(56) References Cited

U.S. PATENT DOCUMENTS

2012/0205606 A1* 8/2012 Lee .................. H01L 45/04
　　　　　　　　　　　　　　　　　　　257/2
2016/0115293 A1* 4/2016 Aksay ................ C08K 3/04
　　　　　　　　　　　　　　　　　　　524/496

* cited by examiner

SUPER-FLEXIBLE HIGH THERMAL CONDUCTIVE GRAPHEME FILM AND PREPARATION METHOD THEREOF

CROSS REFERENCE OF RELATED APPLICATION

This is a U.S. National Stage under 35 U.S.C 371 of the International Application PCT/CN2016/090635, filed Jul. 20, 2016, which claims priority under 35 U.S.C. 119(a-d) to CN 201610047646.4, filed Jan. 25, 2016.

BACKGROUND OF THE PRESENT INVENTION

Field of Invention

The present invention relates to a new thermal conductive material and a preparation method thereof, and more particularly to a super-flexible high thermal conductive grapheme film and a preparation method thereof.

Description of Related Arts

In 2010, two professors at the University of Manchester, UK, Andre GeiM and Konstantin Novoselov, won the Nobel Prize in Physics for the first time in the world for the successful separation of stable graphene, which set off a worldwide craze for graphene research. Graphene has excellent electrical properties whose electron mobility is $2 \times 10^5$ $cM^2/Vs$ at room temperature, outstanding thermal conductivity of 5000 W/MK, exceptional specific surface area of 2630 $M^2/g$, Young's modulus of 1100 GPa and breaking strength of 125 GPa. Graphene has more excellent thermal and electrical performance than metals, and meanwhile graphene has the advantages of high temperature and corrosion resistance. Moreover, due to good mechanical properties and low density, grapheme has the potential to replace metals in the field of electrothermal materials.

Graphene films, formed through macroscopically assembling graphene oxide or graphene nano-sheets, are main application forms of nano-scale grapheme and are commonly prepared through suction filtration method, scratching film method, spin coating method, spraying method and dip coating method. Through further high-temperature treatment, the defects of graphene can be repaired, and the electric conductivity and thermal conductivity of the graphene film can be effectively improved, so that the graphene film can be widely applied to portable electronic devices with high heat dissipation demands, such as smart phones, smart portable hardware, tablet personal computers and notebook computers.

However, the currently used graphene oxide itself is not enough in size and contains a lot of debris, so that it has not been sufficiently developed in terms of thermal conductivity. The thermal conductivity of the graphene oxide is limited to 1400 W/mK, which cannot meet the rapid development of science and technology. Moreover, the insufficient structure design of the film makes the flexibility thereof unclear, which limits the application thereof in flexible devices. Therefore, ultra large graphene oxide sheets are adopted to prepare the grapheme film, which greatly reduces the edge phonon dissipation and repairs the damaged structure under high temperature, so as to provide a channel for high thermal conductivity. In addition, while preparing holes at high temperature with hole preparing agent, a lot of micro-airbags are formed, thus obtaining the porous graphene film. After being suppressed, the pores disappear and the film structure becomes dense while wrinkles are retained, so that the obtained film is excellent in flexibility.

SUMMARY OF THE PRESENT INVENTION

An object of the present invention is to provide a super-flexible high thermal conductive graphene film and a preparation method thereof, so as to overcome deficiencies of prior arts.

The above object of the present invention is achieved through technical solutions as follows. A super-flexible high thermal conductive graphene film has a density in a range of 1.93-2.11 $g/cm^3$, is formed by overlapping planar oriented graphene sheets with an average size of more than 100 μm with each other through π-π conjugate action, and contains 1 to 4 layers of graphene sheets, wherein the graphene sheets have few defects and meet a condition of $I_D/T_G<0.01$.

Further, a debris content of the graphene sheets with the average size of more than 100 μm by mass is lower than 1%, and a distribution coefficient thereof is smaller than 0.5.

A preparation method of a super-flexible high thermal conductive graphene film comprises steps of:

(1) preparing graphene oxide sheets with an average size of more than 100 μm into a graphene oxide aqueous solution with a concentration in a range of 6-30 mg/mL, adding an additive with a mass fraction of 0.1-5% into the aqueous solution, wherein the additive is inorganic salt, small organic molecule or macromolecule; pouring the aqueous solution added with the additive onto a mold plate after ultrasonic dispersion, drying, obtaining a graphene oxide film, performing reduction on the graphene oxide film through a reducing agent;

(2) increasing a temperature of the reduced graphene film to 500-800° C. at a speed of 0.1-1° C./min and preserving heat for 0.5-2 h under inert gas atmosphere;

(3) increasing the temperature of the reduced graphene film to 1000-1300° C. at a speed of 1-3° C./min and preserving heat for 0.5-3 h under inert gas atmosphere;

(4) increasing the temperature of the reduced graphene film to 2500-3000° C. at a speed of 5-8° C./min and preserving heat for 0.5-4 h under inert gas atmosphere; and then naturally decreasing the temperature of the graphene film, obtaining a porous graphene film; and (5) suppressing the porous graphene film under high pressure, and finally obtaining the super-flexible high thermal conductive graphene film.

Preferably, the inorganic salt is ammonium bicarbonate, urea, thiourea, or azodicarbonamide; the small organic molecule is glycerol, polyethylene glycol 200 or polyethylene glycol 400; the macromolecule is cellulose, gelatin, chitosan, waterborne polyurethane, or acrylic emulsion.

Preferably, the reducing agent is hydrazine hydrate, amines, ascorbic acid, or hydrogen iodide; and more preferably, is hydrazine hydrate since hydrazine hydrate expands the film material during the reducing process.

Preferably, a pressure and a time in the suppressing process are respectively 50-200 MP and 6-300 h.

Preferably, the graphene oxide sheets in the step (1) with the average size of more than 100 μm are prepared through following steps of:

(A) diluting a reaction solution of the graphite oxide sheets obtained by Modified-Hummer method, filtering the reaction solution with a mesh screen with a pore diameter of 140 meshes, and obtaining a filtered product;

(B) evenly mixing the filtered product obtained in the step (A) with ice water in accordance with a volume ratio of 1:10, obtaining a mixture, standing the mixture for 2 h, dropwise adding hydrogen peroxide with a mass fraction of 30% into the stood mixture till a color of the mixture no longer changes (that is, potassium permanganate in the mixture is completely removed);

(C) dropwise adding concentrated hydrochloric acid with a concentration of 12 mol/L into the mixture added with hydrogen peroxide obtained in the step (B) till flocculent graphite oxide disappears, and then filtering out graphite oxide crystals through the mesh screen with the pore diameter of 140 meshes; and (D) placing the graphite oxide crystals obtained in the step (C) into a shaking table, shocking and washing at a speed of 20-80 rev/min, peeling off the graphite oxide crystals, and obtaining the debris-free and giant graphene oxide sheets with an average size of more than 87 μm and a distribution coefficient of 0.2-0.5.

Preferably, in the step (A), the Modified-Hummer method comprises sufficiently dissolving potassium permanganate in concentrated sulfuric acid with a mass fraction of 98% at −10° C., adding graphite, stirring at a speed of 60 rev/min for 2 h, stopping stirring, reacting for 6-48 h at a low temperature in a range of −10° C. to 20° C., and obtaining a widely distributed reaction solution of the graphite oxide sheets, wherein a mass volume ratio of the graphite, the potassium permanganate and the concentrated sulfuric acid is 1 g:(2-4) g:(30-40) ml, and a granularity of the graphite is larger than 150 μm.

Preferably, the mesh screen is titanium alloy acid-resistant mesh screen.

Preferably, in the step (A), the reaction solution of the graphite oxide sheets is diluted through concentrated sulfuric acid diluting agent, wherein a volume of the diluting agent is 1-10 times of the volume of the reaction solution.

The present invention provides a perfect large conjugate structure by preparing the film with ultra large graphene oxide sheets, and perfectly repairing defects of graphene by annealing the ultra large graphene oxide sheets at high temperature to minimize edge defects of the film. The conjugate size even extends to the entire graphene sheets to ensure the smooth thermal path of graphene. Moreover, through three independent temperature rise steps, the functional groups on the surface of graphene are gradually peeled off, the additive (pore making agent) included among the graphene sheets are slowly decomposed; both the functional groups and the additive are released step by step in the form of gas. Simultaneously, the graphitization process expands one by one to form graphene micro-airbags. Furthermore, the micro-airbags are compressed under high pressure conditions to form wrinkles, so that the formation of the graphene film is memorized to obtain super-flexibility. In the formation process of the micro-airbags, the most stable functional groups on the surface of graphene are also peeled off, added with the gas expansion at high temperature, the graphene structure which contains 1 to 4 layers of graphene sheets is formed. The multi-layers of graphene sheets greatly improve the electric conductivity and the heat conductivity of the material. The combination of ultra-high electric and thermal conductivity and flexibility makes the thermal-conductive film has an extremely promising potential for high-frequency flexible electronic devices.

DETAILED DESCRIPTION OF THE PREFERRED EMBODIMENT

Through the ultra large graphene oxide sheets, the graphene film provided by the present invention is formed. The planar oriented graphene sheets with an average size of larger than 100 μm play an important role in preparing the graphene film of the present invention. In the present invention, before the graphene oxide crystals are washed, the debris is filtered out through a mesh screen; and then ice water with a volume of 10 times of the volume of the filtered product is adopted to dilute, such that the crystals are not destroyed due to the dissolution heat of sulfuric acid. Moreover, the graphene oxide crystals are shocked and washed through a shaking table, which avoids the mechanical breaking when the graphene oxide sheets are peeled off. Furthermore, in the present invention, the graphene sheets are prepared at a low temperature; at the low temperature, potassium permanganate is weak in oxidizability and is slow in producing oxygen through self-decomposition, so that the fragmentation of the gas on the graphite oxide crystals is very weak, thus the graphene oxide sheets are preserved. In addition, no violent stirring or ultrasound process in the reaction and washing process. Therefore, the sheets are basically not broken. In conclusion, the debris-free and giant graphene film with an average size of larger than 87 μm, a distribution coefficient thereof in a range of 0.2 to 0.5, and a debris content of lower than 1%. The graphene sheets have few deficiencies and meet a condition of $I_D/I_G<0.01$.

The present invention is further explained with accompanying drawings and embodiments as follows. The embodiments are only used for further description of the present invention, and cannot be understood as a limitation on the protection scope of the present invention, and any non-essential changes and adjustments made by those skilled in the art based on the above contents belong to the protection scope of the present invention.

First Embodiment: Preparation of Debris-Free and Giant Graphene Oxide Sheets

EXAMPLE 1-1

Figure 1:
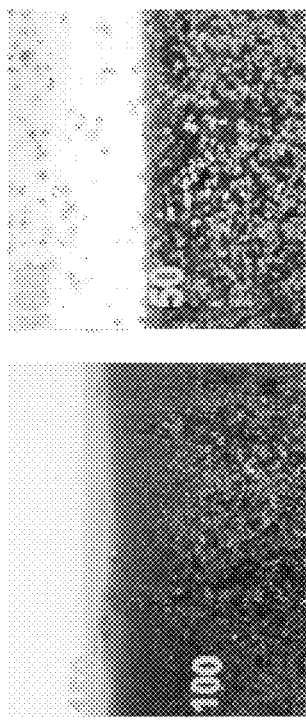
FIG. 1 shows pre-filtered graphite oxide crystals (left) and filtered graphite oxide crystals (right).
Figure 2:
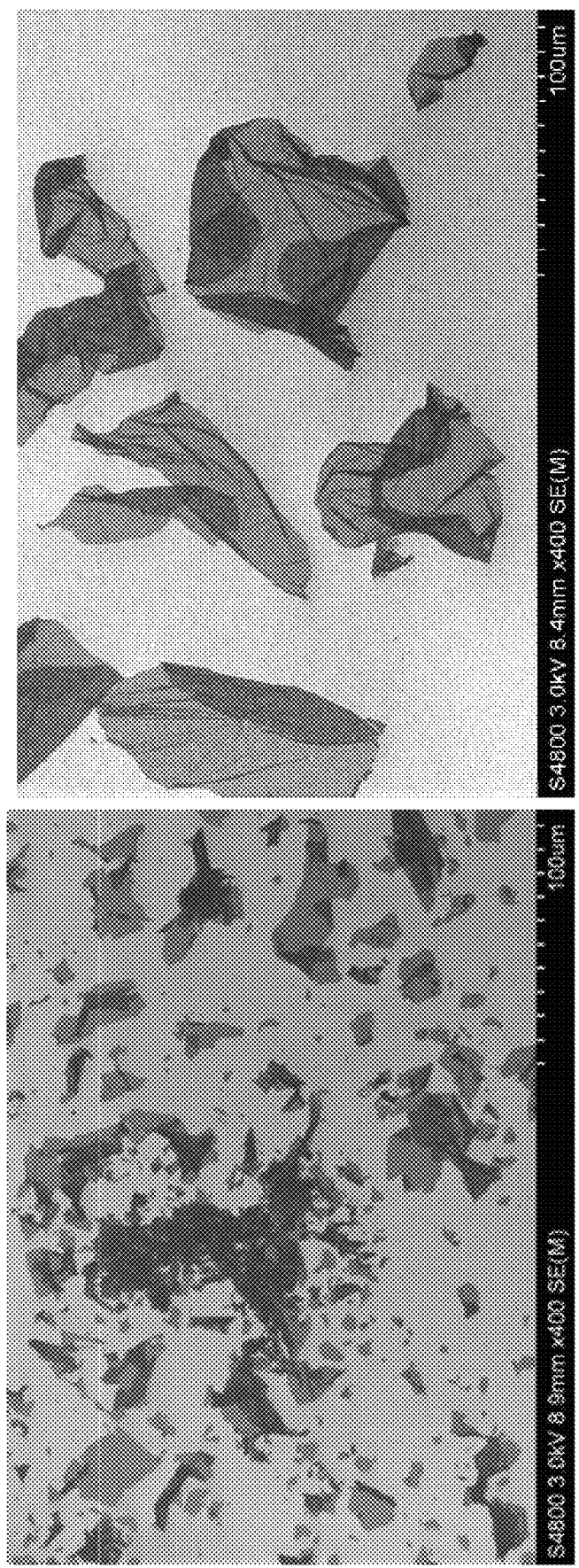
FIG. 2 show pre-filtered graphene oxide (left) and filtered graphene oxide (right).

(1) Slowly adding potassium permanganate into a first amount of fast-stirring concentrated sulfuric acid at −10° C., adding graphite and slowly stirring at a speed of 60 revolutions/minute for 2 h after fully dissolving the potassium permanganate, stopping stirring, respectively reacting at 20° C. and 50° C., and respectively obtaining widely-distributed graphite oxide crystals. As shown in FIG. 1, there are more debris in the two graphite oxide wafers obtained at two temperatures, which makes the corresponding graphene oxide also has a lot of debris (as shown in FIG. 2).

(2) Diluting a reaction solution obtained in step (1) with a second amount of concentrated sulfuric acid (wherein the dilution factor is able to be any multiple, and in this embodiment the reaction solution is diluted by about 10 times), filtering out the graphite oxide crystals using a titanium alloy mesh screen with a pore diameter of 150 μm (or 140 meshes), recycling the reaction solution, slowly adding the filtered product into fast-stirring ice water with a volume of 10 times relative to the filtered product, standing for 2 h, slowly adding $H_2O_2$ to remove excess potassium permanganate, adding appropriate amount of hydrochloric acid till flocculent graphite oxide disappears, filtering out the graphite oxide wafers through the titanium alloy mesh screen with the pore diameter of 140 meshes; slowly shocking and washing by a shaking table; and obtaining the debris-free and giant graphene oxide sheets with an average size of 87 μm and a distribution coefficient of 0.5. A mass volume ratio of the graphite, the potassium permanganate and the first amount of concentrated sulfuric acid is 1 g:2 g:40 ml, and a granularity of the graphite is 200 μm.

Figure 3:
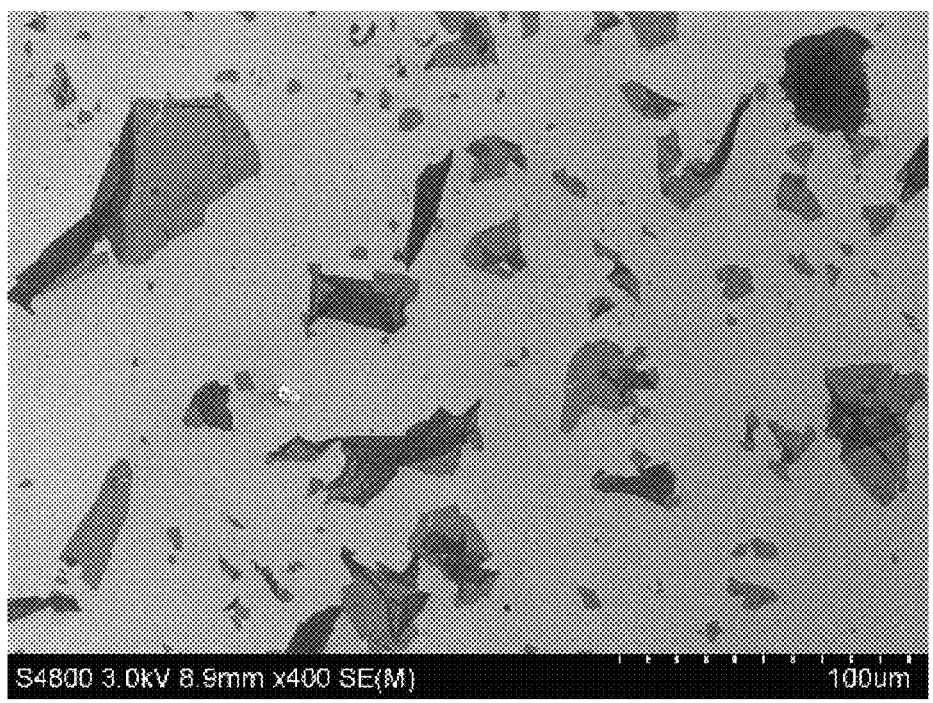
FIG. 3 shows graphene oxide obtained at 50° C.
Figure 4:
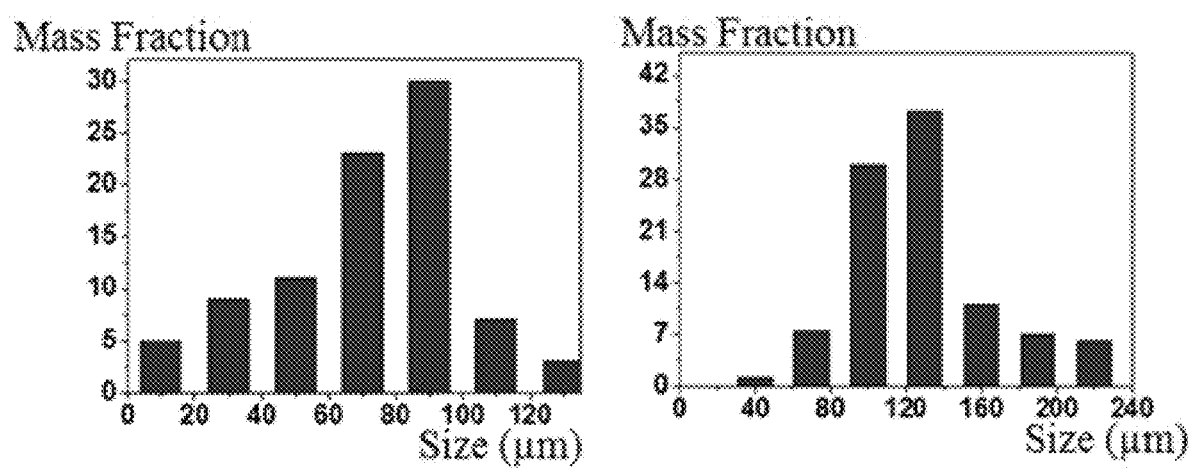
FIG. 4 shows a size distribution of graphene oxide obtained at 50° C. (left) and a size distribution of graphene oxide obtained at 20° C. (right).

Referring to FIG. 3, after reaction at a high temperature of 50° C., the separated graphite oxide wafers are washed to obtain the graphene oxide sheets which also have a lot of debris. It can be seen from FIG. 4 that after reaction at a low temperature of 20° C., the separated graphene oxide sheets have more evenly concentrated size distribution and very little debris.

EXAMPLE 1-2

Slowly adding potassium permanganate into a first amount of fast-stirring concentrated sulfuric acid at −10° C., adding graphite and slowly stirring at a speed of 60 revolutions/minute for 2 h after fully dissolving the potassium permanganate, stopping stirring, reacting at a low temperature of 0° C. for 48 h, and obtaining a reaction solution; diluting the reaction solution respectively using a second amount of concentrated sulfuric acid with a mass fraction of 98% above and dilute sulfuric acid with a mass fraction of 10%, filtering out the graphite oxide crystals using a titanium alloy mesh screen with a pore diameter of 150 μm, recycling the reaction solution, slowly adding the filtered product into fast-stirring ice water with a volume of 10 times relative to the filtered product, standing for 2 h, slowly adding $H_2O_2$ to remove excess potassium permanganate, adding appropriate amount of hydrochloric acid till flocculent graphite oxide disappears, filtering out the graphite oxide wafers with the titanium alloy mesh screen; slowly shocking and washing by a shaking table; and obtaining a reaction product. A mass volume ratio of the graphite, the potassium permanganate and the first amount of concentrated sulfuric acid is 1 g:4 g:30 ml, and a granularity of the graphite is 500 μm.

The debris-free and giant graphene oxide sheets, obtained by the dilution of the second amount of concentrated sulfuric acid, has an average size of 98 μm and a distribution coefficient of 0.4; and the product obtained by the dilution of the dilute sulfuric acid contains a lot of debris and has a size distribution coefficient of more than 100%. The reason of the above phenomenon is that in the process of dilution, the dilute sulfuric acid exhausts a lot of heat, so that the graphite oxide crystals are destroyed.

EXAMPLE 1-3

Slowly adding potassium permanganate into a first amount of fast-stirring concentrated sulfuric acid at −10° C., adding graphite and slowly stirring at a speed of 60 revolutions/minute for 2 h after fully dissolving the potassium permanganate, stopping stirring, reacting at a low temperature of 20° C. for 28 h, and obtaining widely-distributed graphite oxide crystals; diluting the reaction solution using a second amount of concentrated sulfuric acid, filtering out the graphite oxide crystals using a titanium alloy mesh screen with a pore diameter of 150 μm, recycling the reaction solution, respectively slowly adding the filtered product into fast-stirring ice water with a volume of 5, 8 and 10 times relative to the filtered product, standing for 2 h, slowly adding $H_2O_2$ to remove excess potassium permanganate, adding appropriate amount of hydrochloric acid till flocculent graphite oxide disappears, filtering out the graphite oxide wafers with the titanium alloy mesh screen; slowly shocking and washing by a shaking table; and obtaining a reaction product. A mass volume ratio of the graphite, the potassium permanganate and the first amount of concentrated sulfuric acid is 1 g:5 g:34 ml, and a granularity of the graphite is 2 mm.

Experimental results show that the ice water with the volume of 5 and 8 times relative to the filtered product is unable to obtain the graphene sheets with a uniform size, but only the ice water with the volume of 10 times relative to the filtered product is able to obtain the debris-free and giant graphene oxide sheets with an average size of 92 μm and a distribution coefficient of 0.2. Therefore, it can be known that the amount of ice water is too low, so that the mixed heat is concentrated and released, which destroys the structure of the crystals.

Second Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 6 mg/mL, and then adding ammonium bicarbonate with a mass fraction of 0.1 into the aqueous solution, pouring the aqueous solution added with the ammonium bicarbonate onto a mold plate after ultrasonic dispersion, drying, obtaining a graphene oxide film, performing reduction on the graphene oxide film through hydrazine hydrate reducing agent; gradually increasing a temperature of the reduced graphene film to 500° C. and preserving heat for 2 h under inert gas atmosphere; gradually increasing the temperature of the reduced graphene film from 500° C. to 1000° C. and preserving heat for 3 h under inert gas atmosphere; gradually increasing the temperature of the reduced graphene film from 1000° C. to 2500° C. and preserving heat for 4 h under inert gas atmosphere; and then naturally decreasing the temperature of the graphene film, obtaining a porous graphene film; suppressing the porous graphene film under high pressure, and finally obtaining the super-flexible high thermal conductive graphene film.

A temperature rise rate at 500° C. is 0.1° C./min, a temperature rise rate at 1000° C. is 1° C./min, and a temperature rise rate at 2500° C. is 5° C./min. A pressure and a time in the suppressing process are respectively 200 MP and 100 h.

Figure 5:
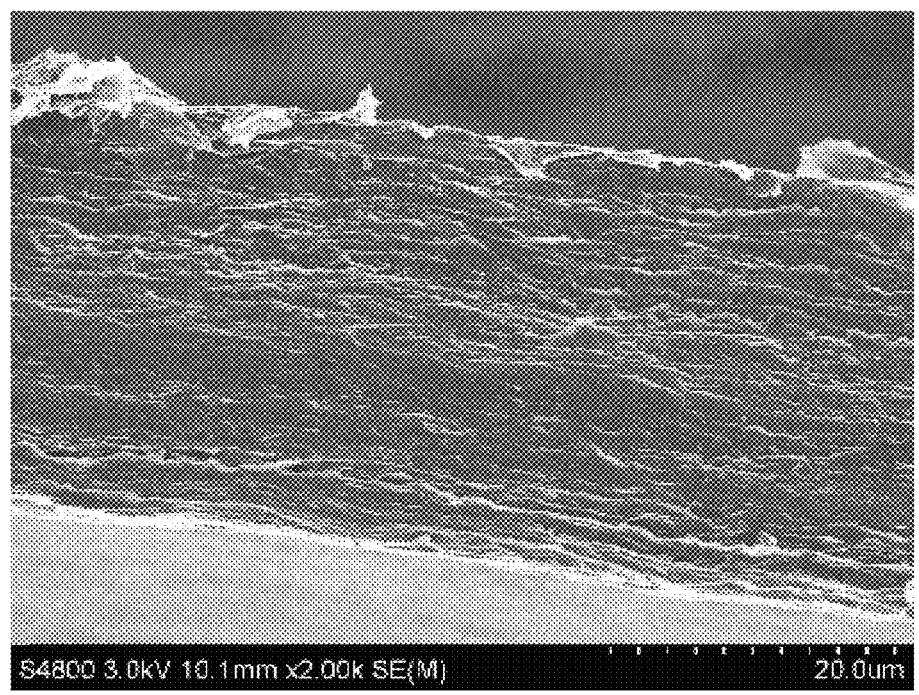
FIG. 5 is a sectional view of a graphene film.
Figure 6:
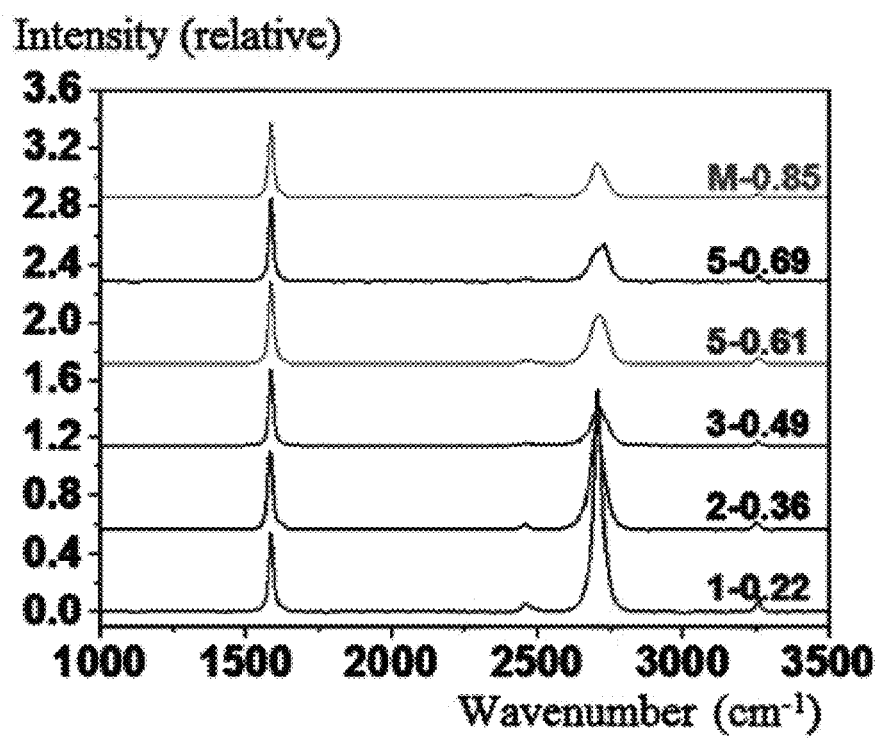
FIG. 6 a Raman spectrogram of an internal structure of the graphene film.
Figure 7:
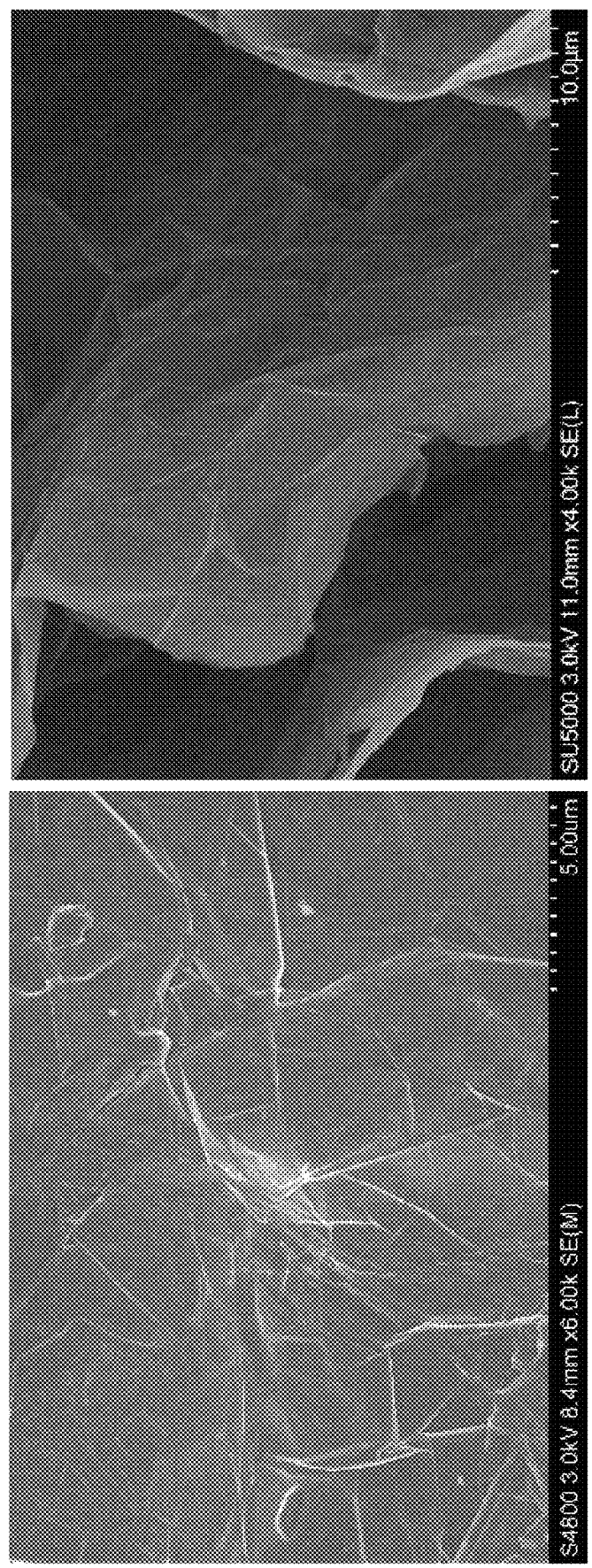
FIG. 7 shows a scanning electron microscopy image of a surface and an interior of the graphene film.

The obtained film has a density of 2.11 g/cm$^3$, is able to be bent repeatedly more than 1200 times, and has a tensile strength of 80 MP, an electric conductivity of 10600 S/cm, and a heat conductivity of 2100 W/mK. As shown in FIG. 5, the graphene film has a dense structure; after reduction at high pressure, the graphene film contains multiple layers of graphene sheets therein whose structures are perfect (as shown in FIG. 6), which provides the basis for heat conduction. There are a lot of wrinkles on a surface or inside the graphene film (as shown in FIG. 7), which establishes the foundation for the flexibility of the graphene film. It can be seen from FIG. 8 that the elongation at break of the graphene film provided by the present invention reaches 16%, which belongs to the flexible fracture. After being repeatedly folded in two, the electric conductivity of the graphene film changes slightly and remains at 10600 S/cm, which means that the flexibility is good. Moreover, after being repeatedly calendered, performances of the graphene film are able to be recovered as before, which means that the graphene film prepared through the present invention is macroscopically assembled by true graphene.

FIRST COMPARATIVE EXAMPLE

As mentioned in the first embodiment, the temperature rise condition is changed as follows.

The temperature is directly increased to 2500° C. at a speed of 100° C./min and the reaction time is as same as the first embodiment, the prepared film has the elongation at break of 6%, the tensile strength of 20 MP, the electric conductivity of 4000 S/cm, the heat conductivity of 1000 W/mK.

SECOND COMPARATIVE EXAMPLE

Figure 8:
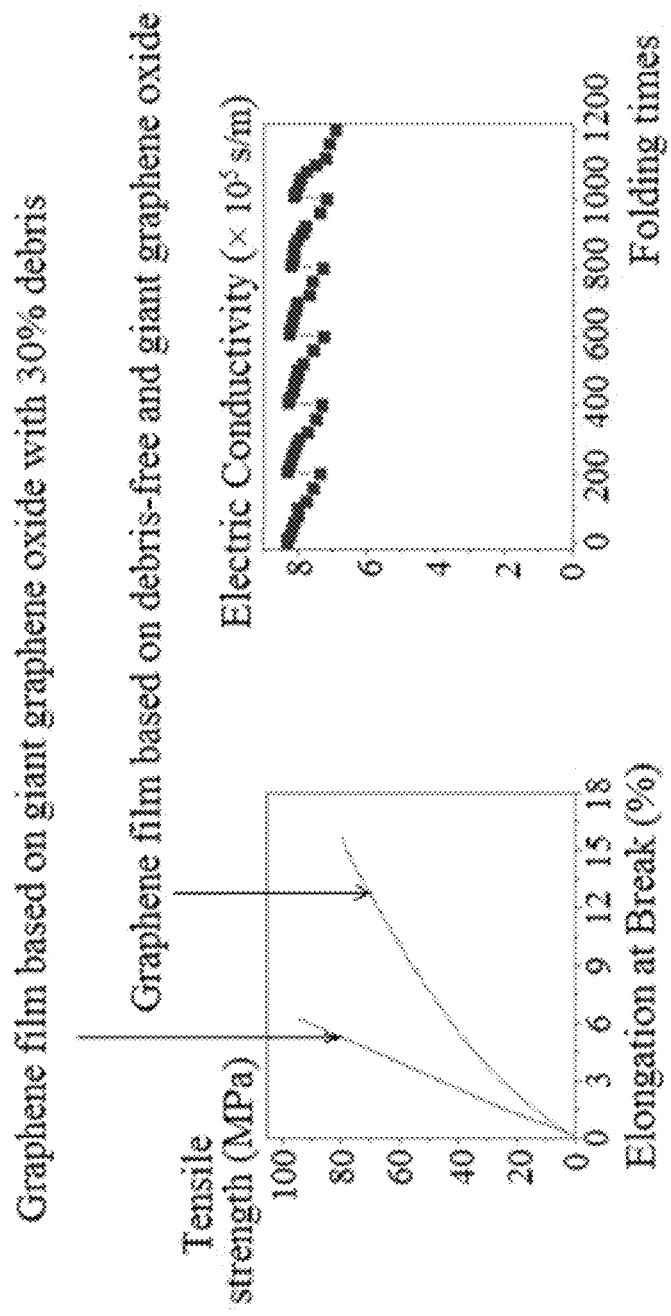
FIG. 8 shows an elongation at break of the graphene film (left) and a change in electric conductivity of the graphene film after being repeatedly bent (right).

As mentioned in the first embodiment, the material made into the graphene oxide is changed, and the graphene oxide with the debris content of about 30% is used. Accordingly, the prepared film has the elongation at break of 7% (as shown in FIG. 8), the tensile strength of 10 MP, the electric conductivity of 3400 S/cm, and the heat conductivity of 800 W/mK.

Third Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 30 mg/mL, adding urea with a mass fraction of 5% into the aqueous solution, pouring the aqueous solution added with the urea onto a mold plate after ultrasonic dispersion, drying, obtaining a graphene oxide film, performing reduction on the graphene oxide film through hydrogen iodide reducing agent; performing heat treatment on the reduced graphene film under inert gas atmosphere through three steps in accordance with heat treatment methods shown in Table 1 to Table 3; naturally decreasing a temperature of the graphene film after the heat treatment, obtaining a porous graphene film; suppressing the porous graphene film under high pressure, and finally obtaining the super-flexible high thermal conductive graphene film. A pressure and a time in the suppressing process are respectively 200 MP and 300 h.

TABLE 1

Temperature Rise Conditions of the First Step of Heat Treatment

| | | | | | | | | |
|---|---|---|---|---|---|---|---|---|
| first step | temperature rise rate (° C./min) | 0.5 | 0.5 | 0.5 | 0.5 | 0.5 | 0.05 | 0.1 |
| | endpoint temperature (° C.) | 400 | 500 | 700 | 800 | 900 | 700 | 700 |
| | heat preservation time (h) | 1 | 1 | 1 | 1 | 1 | 1 | 1 |
| second step | temperature rise rate (° C./min) | | | | 2 | | | |
| | endpoint temperature (° C.) | | | | 1000 | | | |
| | heat preservation time (h) | | | | 1 | | | |
| third step | temperature rise rate (° C./min) | | | | 6 | | | |
| | endpoint temperature (° C.) | | | | 2500 | | | |
| | heat preservation time (h) | | | | 1 | | | |
| product | | A1 | B1 | C1 | D1 | E1 | F1 | G1 |
| repeated bending-resistant time | | 800 | 1200 | 1300 | 1700 | 400 | 500 | 2100 |
| elongation at break % | | 3 | 6 | 8 | 11 | 14 | 3 | 12 |
| electronic conductivity (s/cm) | | 2000 | 6700 | 6500 | 7600 | 3400 | 4300 | 7100 |
| thermal conductivity (W/mK) | | 1000 | 1400 | 1450 | 1480 | 800 | 450 | 1530 |
| first step | temperature rise rate (° C./min) | 1.2 | 0.5 | 0.5 | 0.5 | 0.5 | 0.5 | |
| | endpoint temperature (° C.) | 700 | 700 | 700 | 700 | 700 | 700 | |
| | heat preservation time (h) | 1 | 0.2 | 0.5 | 1.5 | 2 | 2.2 | |
| second step | temperature rise rate (° C./min) | | | | 2 | | | |
| | endpoint temperature (° C.) | | | | 1000 | | | |
| | heat preservation time (h) | | | | 1 | | | |

TABLE 1-continued

| Temperature Rise Conditions of the First Step of Heat Treatment | | | | | | | |
|---|---|---|---|---|---|---|---|
| third step | temperature rise rate (° C./min) | 6 | | | | | |
| | endpoint temperature (° C.) | 2500 | | | | | |
| | heat preservation time (h) | 1 | | | | | |

| product | H1 | I1 | J1 | K1 | L1 | M1 |
|---|---|---|---|---|---|---|
| repeated bending-resistant time | 700 | 780 | 2221 | 1433 | 1545 | 500 |
| elongation at break % | 5 | 2 | 11 | 11 | 14 | 4 |
| electronic conductivity (s/cm) | 5200 | 2500 | 8600 | 8100 | 8300 | 4900 |
| thermal conductivity (W/mK) | 1100 | 1000 | 1440 | 1800 | 1790 | 780 |

TABLE 2

| Temperature Rise Conditions of the Second Step of Heat Treatment | | | | | | | |
|---|---|---|---|---|---|---|---|
| first step | temperature rise rate (° C./min) | 0.5 | | | | | |
| | endpoint temperature (° C.) | 800 | | | | | |
| | heat preservation time (h) | 1 | | | | | |
| second step | temperature rise rate (° C./min) | 0.8 | 1 | 2 | 3 | 3.5 | 2 | 2 |
| | endpoint temperature (° C.) | 1.2 K | 1.2 K | 1.2 K | 1.2 K | 1.2 K | 0.8 K | 1 K |
| | heat preservation time (h) | 1 | 1 | 1 | 1 | 1 | 1 | 1 |
| third step | temperature rise rate (° C./min) | 6 | | | | | |
| | endpoint temperature (° C.) | 2500 | | | | | |
| | heat preservation time (h) | 1 | | | | | |

| product | A2 | B2 | C2 | D2 | E2 | F2 | G2 |
|---|---|---|---|---|---|---|---|
| repeated bending-resistant time | 500 | 1200 | 1100 | 1300 | 600 | 700 | 1400 |
| elongation at break % | 3 | 11 | 7 | 9 | 4 | 4 | 11 |
| electronic conductivity (s/cm) | 3000 | 7100 | 7800 | 8100 | 5600 | 6100 | 7600 |
| thermal conductivity (W/mK) | 300 | 1520 | 1570 | 1650 | 1200 | 809 | 1670 |

| first step | temperature rise rate (° C./min) | 0.5 | | | | | |
|---|---|---|---|---|---|---|---|
| | endpoint temperature (° C.) | 800 | | | | | |
| | heat preservation time (h) | 1 | | | | | |
| second step | temperature rise rate (° C./min) | 2 | 2 | 2 | 2 | 2 | 2 |
| | endpoint temperature (° C.) | 1.4 K | 1.2 K | 1.2 K | 1.2 K | 1.2 K | 1.2 K |
| | heat preservation time (h) | 1 | 0.2 | 0.5 | 2 | 3 | 3.5 |
| third step | temperature rise rate (° C./min) | 6 | | | | | |
| | endpoint temperature (° C.) | 2500 | | | | | |
| | heat preservation time (h) | 1 | | | | | |

| product | H2 | I2 | J2 | K2 | L2 | M2 |
|---|---|---|---|---|---|---|
| repeated bending-resistant time | 300 | 400 | 1500 | 2100 | 2200 | 200 |
| elongation at break % | 5 | 3 | 12 | 11 | 16 | 2 |
| electronic conductivity (s/cm) | 5400 | 4300 | 6200 | 6700 | 7400 | 3490 |
| thermal conductivity (W/mK) | 1100 | 1089 | 1680 | 1800 | 1780 | 1020 |

TABLE 3

| Temperature Rise Conditions of the Third Step of Heat Treatment | | | | | | | | |
|---|---|---|---|---|---|---|---|---|
| first step | temperature rise rate (° C./min) | 0.5 | | | | | | |
| | endpoint temperature (° C.) | 800 | | | | | | |
| | heat preservation time (h) | 1 | | | | | | |
| second step | temperature rise rate (° C./min.) | 2 | | | | | | |
| | endpoint temperature (° C.) | 1000 | | | | | | |
| | heat preservation time (h) | 1 | | | | | | |
| third step | temperature rise rate (° C./min) | 3 | 5 | 7 | 8 | 9 | 7 | 7 |
| | endpoint temperature (° C.) | 2.5 K | 2.5 K | 2.5 K | 2.5 K | 2.5 K | 1.8 K | 2.5 K |
| | heat preservation time (h) | 1 | 1 | 1 | 1 | 1 | 1 | 1 |
| product | | A3 | B3 | C3 | D3 | E3 | F3 | G3 |
| repeated beading-resistant time | | 200 | 1200 | 1400 | 1500 | 400 | 500 | 1400 |
| elongation at break % | | 3 | 6 | 8 | 8 | 4 | 4 | 9 |
| electronic conductivity (s/cm) | | 4000 | 6000 | 6700 | 7200 | 4300 | 4500 | 8600 |
| thermal conductivity (W/mK) | | 1000 | 1400 | 1540 | 1530 | 890 | 760 | 1440 |
| first step | temperature rise rate (° C./min) | 0.5 | | | | | | |
| | endpoint temperature (° C.) | 800 | | | | | | |
| | heat preservation time (h) | 1 | | | | | | |
| second step | temperature rise rate (° C./min.) | 2 | | | | | | |
| | endpoint temperature (° C.) | 1000 | | | | | | |
| | heat preservation time (h) | 1 | | | | | | |
| third step | temperature rise rate (° C./min) | 7 | 7 | 5 | 5 | 5 | 5 | |
| | endpoint temperature (° C.) | 3 K | 3.5 K | 2.5 K | 2.5 K | 2.5 K | 2.5 K | |
| | heat preservation time (h) | 1 | 1 | 0.2 | 0.5 | 4 | 4.2 | |
| product | | H3 | I3 | J3 | K3 | L3 | M3 | |
| repeated beading-resistant time | | 2100 | 700 | 800 | 1200 | 1000 | 500 | |
| elongation at break % | | 10 | 4 | 5 | 11 | 14 | 3 | |
| electronic conductivity (s/cm) | | 8400 | 5000 | 5400 | 8100 | 8200 | 8300 | |
| thermal conductivity (W/mK) | | 1800 | 1090 | 890 | 1570 | 1790 | 890 | |

It can be seen from Table 1 to Table 3 that: performances of the material are mainly determined by three aspects of (1) structure repair situations of the graphene oxide sheets inside the material, that is, functional group detachment and carbon conjugate structure repair under high pressure; (2) the continuity of three-dimensional orientation structure inside the material, that is, the continuity of internal sheet structure; and (3) the formation of micro-airbags which ensures the flexibility of the material and the existence of graphene sheet structure. The three aspects work together to enhance performances of the graphene film.

It can be seen from Table 1 that: the products A1, B1, C1, D1 and E1 are compared, the temperature of the product A1 is too low to remove most of the easily degradable functional groups, and accordingly, a large amount of gases are rapidly generated in the second step of high temperature to tear the sheet structure at high temperature; the temperature of the product E1 is too high, so that gases are generated too fast and a lot of material internal structures are torn, both of which result in poor material properties. Only at the temperature of the products B1, C1 and D1, the functional groups are slowly and completely removed to protect the material properties. The products C1, F1, G1 and H1 are compared, the temperature rise rate of F1 is too low, so that the release of gases is too slow, causing through-holes are unable to be formed inside the material, so that it is not conducive for micro-airbags to form in the next temperature rise process; the temperature of the product H1 is increased too fast, so that the release of gases is too fast, causing the internal structure of the material is torn, which is not conducive to forming transmission channels. Only at the temperature rise rate of CG, it is able to be ensured that the micro-airbags are formed and the channel is complete. C1, I1, J1, K1, L1 and M1 are compared, the heat preservation time of the product I1 is too short, which is unable to ensure the degradation of most functional groups; the heat preservation time of the product M1 is too long, so that the tar inside the stove is absorbed, which is not conductive to improving performances. The products C1, J1, K1 and L1 just overcome above deficiencies.

It can be seen from Table 2 that: the products A2, B2, C2, D2 and E2 are compared, the temperature rise rate of the product A2 is too low to form the small gap structure, so that the film is unable to form micro-airbags, which seriously affects the electromagnetic shielding performance; the temperature rise rate of the product E2 is too high, so that the interlayer structure of graphene is torn, which makes the connectivity and the thermal conductive electromagnetic shielding performance of the graphene film worse. Only at the temperature rise rate of B2, C2 and D2, the micro-bag structure and the internal continuity of the graphene film are ensured. C2, I2, J2, K2, L2 and M2 are compared, the heat preservation time of the product I2 is too short, stable functional groups are unable to be sufficiently peeled off; the heat preservation time of the product M2 is too long, the graphene film easily absorbs tar, which is not conductive to improving performances of the film; and when the product is C2, J2, K2 or M2, it is able to be ensured that the stable functional groups are sufficiently peeled off and the tar is avoided.

It can be seen from Table 3 that: the products A3, B3, C3, D3 and E are compared, the temperature rise rate of the product A3 is too low, so that the most stable functional group peels off too slow, which is not enough to support the formation of micro-airbags; the temperature rise process of the product E3 is too fast, so that the release and expansion at high temperature of gases is too fast, which easily destroys the formation of the micro-bags. Only at the temperature rise rate of B3, C3 and D3, the micro-airbags are able to be stably formed, so as to slowly repair the graphene structure. The products C3, F3, G3, H3 and I3 are compared, the endpoint temperature of the product F3 is too low, and the graphene structure is insufficiently repaired, so that various performances are poor; the endpoint temperature of the product I3 is too high, graphene is easily vaporized; only at the temperature of the product C3, G3 or H3, it is ensured that the graphene structure is repaired and is not vaporized. The products C3, J3, K3, L3 and M3 are compared, the heat preservation time of J3 is too low, the graphene structure is unable to be sufficiently repaired; the heat preservation time of M3 is too long, the tar in the furnace is easily absorbed, which affects the performance of the film.

Fourth Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 16 mg/mL, adding glycerin with a mass fraction of 1% into the aqueous solution, pouring the aqueous solution added with the glycerin onto a mold plate after ultrasonic dispersion, drying, obtaining a graphene oxide film, performing reduction on the graphene oxide film through hydrazine hydrate reducing agent; gradually increasing a temperature of the reduced graphene film to 800° C. and preserving heat for 1 h under inert gas atmosphere; gradually increasing the temperature of the reduced graphene film from 800° C. to 1000° C., and preserving heat for 3 h under inert gas atmosphere; gradually increasing the temperature of the reduced graphene film from 1000° C. to 2500° C., and preserving heat for 2 h under inert gas atmosphere; and then naturally decreasing the temperature of the graphene film, obtaining a porous graphene film; suppressing the porous graphene film under high pressure, and finally obtaining the super-flexible high thermal conductive graphene film.

A temperature rise rate at 800° C. is 1° C./min, a temperature rise rate at 1000° C. is 1° C./min, and a temperature rise rate at 2500° C. is 6° C./min.

A pressure and a time in the suppressing process are respectively 50 MP and 6 h.

The obtained super-flexible high thermal conductive graphene film has a density of 1.98 g/cm$^3$, is able to be bent repeatedly more than 1200 times, an elongation at break of 12%, a tensile strength of 43 MP, an electric conductivity of 9700 S/cm, and a heat conductivity of 1900 W/mK.

Fifth Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 6 mg/mL, adding azodicarbonamide with a mass fraction of 4% into the aqueous solution, pouring the aqueous solution added with the azodicarbonamide onto a mold plate after ultrasonic dispersion, drying, obtaining a graphene oxide film, performing reduction on the graphene oxide film through ascorbic acid reducing agent; gradually increasing a temperature of the reduced graphene film to 500° C. and preserving heat for 2 h under inert gas atmosphere; gradually increasing the temperature of the reduced graphene film from 500° C. to 1300° C., and preserving heat for 0.5 h under inert gas atmosphere; gradually increasing the temperature of the reduced graphene film from 1300° C. to 2500° C., and preserving heat for 4 h under inert gas atmosphere; and then naturally decreasing the temperature of the graphene film, obtaining a porous graphene film; suppressing the porous graphene film under high pressure, and finally obtaining the super-flexible high thermal conductive graphene film.

A temperature rise rate at 500° C. is 0.1° C./min, a temperature rise rate at 1300° C. is 1° C./min, and a temperature rise rate at 2500° C. is 7° C./min.

A pressure and a time in the suppressing process are respectively 50 MP and 120 h.

The obtained super-flexible high thermal conductive graphene film has a density of 2.0 g/cm$^3$, is able to be bent repeatedly for more than 1200 times, an elongation at break of 8%, a tensile strength of 65 MP, an electric conductivity of 8700 S/cm, and a heat conductivity of 2020 W/mK.

Sixth Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 30 mg/mL, adding chitosan with a mass fraction of 3.4% into the aqueous solution, pouring the aqueous solution added with the chitosan onto a mold plate after ultrasonic dispersion, drying, obtaining a graphene oxide film, performing reduction on the graphene oxide film through hydrogen iodide; gradually increasing a temperature of the reduced graphene film to 600° C. and preserving heat for 2 h under inert gas atmosphere; gradually increasing the temperature of the reduced graphene film from 600° C. to 1200° C., and preserving heat for 3 h under inert gas atmosphere; gradually increasing the temperature of the reduced graphene film from 1200° C. to 2600° C., and preserving heat for 0.5 h under inert gas atmosphere; and then naturally decreasing the temperature of the graphene film, obtaining a porous graphene film; suppressing the porous graphene film under high pressure, and finally obtaining the super-flexible high thermal conductive graphene film.

In the preparation method of the super-flexible high thermal conductive graphene film, the reducing agent is hydrazine hydrate, amines, ascorbic acid or hydrogen iodide; and preferably, is hydrazine hydrate since hydrazine hydrate allows the film material to expand during the reduction process.

A temperature rise rate at 600° C. is 0.6° C./min, a temperature rise rate at 1200° C. is 1.3° C./min, and a temperature rise rate at 2600° C. is 6.2° C./min.

A pressure and a time in the suppressing process are respectively 150 MP and 210 h.

The obtained super-flexible high thermal conductive graphene film has a density of 1.95 g/cm$^3$, is able to be bent repeatedly for more than 1200 times, an elongation at break of 15%, a tensile strength of 73 MP, an electric conductivity of 8500 S/cm, and a heat conductivity of 2100 W/mK.

Seventh Embodiment: A Super-Flexible High Thermal Conductive Graphene Film is Prepared Using Debris-Free and Giant Graphene Oxide Sheets Prepared by the First Embodiment Preparing graphene oxide sheets with an average size of more than 100 μm into a graphene oxide aqueous solution with a concentration of 17 mg/mL, adding waterborne polyurethane with a mass fraction of 2% into the aqueous solution, pouring the aqueous solution added with the waterborne polyurethane onto a mold plate after ultrasonic dispersion, drying, obtaining a graphene oxide film, performing reduction on the graphene oxide film through hydrazine hydrate; gradually increasing a temperature of the reduced graphene film to 700° C. and preserving heat for 1 h under inert gas atmosphere; gradually increasing the temperature of the reduced graphene film from 700° C. to 1200° C., and preserving heat for 2 h under inert gas atmosphere; gradually increasing the temperature of the reduced graphene film from 1200° C. to 2700° C., and preserving heat for 1 h under inert gas atmosphere; and then naturally decreasing the temperature of the graphene film, obtaining a porous graphene film; suppressing the porous graphene film under high pressure, and finally obtaining the super-flexible high thermal conductive graphene film.

A temperature rise rate at 700° C. is 0.1° C./min, a temperature rise rate at 1200° C. is 2.1° C./min, and a temperature rise rate at 2700° C. is 6.8° C./min.

A pressure and a time in the suppressing process are respectively 200 MP and 300 h.

The obtained super-flexible high thermal conductive graphene film has a density of 2.11 g/cm$^3$, is able to be bent repeatedly for more than 1200 times, an elongation at break of 9%, a tensile strength of 50 MP, an electric conductivity of 9500 S/cm, and a heat conductivity of 2100 W/mK.

What is claimed is:

1. A preparation method of a super-flexible high thermal conductive graphene film, the preparation method comprising steps of:
(1) preparing graphene oxide sheets with an average size of more than 100 μm into a graphene oxide aqueous solution with a concentration in a range of 6-30 mg/mL, adding an additive with a mass fraction of 0.1-5% into the aqueous solution, wherein the additive is inorganic salt, small organic molecule or macromolecule; pouring the aqueous solution added with the additive onto a mold plate after ultrasonic dispersion, obtaining a graphene oxide film by drying the mold plate, and performing reduction on the graphene oxide film through a reducing agent;
(2) increasing a temperature of the reduced graphene film to 500-800° C. at a speed of 0.1-1° C./min and preserving heat for 0.5-2 h under inert gas atmosphere;
(3) after the step (2), increasing the temperature of the reduced graphene to 1000-1300° C. at a speed of 1-3° C./min and preserving heat for 0.5-3 h under inert gas atmosphere;
(4) after the step (3), increasing the temperature of the reduced graphene film to 2500-3000° C. at a speed of 5-8° C./min and preserving heat for 0.5-4 h under inert gas atmosphere; and then naturally decreasing the temperature of the graphene film, and then obtaining a porous graphene film by forming graphene micro-airbags; and
(5) suppressing the graphene micro-airbags and forming wrinkles, thereby obtaining the super-flexible high thermal conductive graphene film which has a density in a range of 1.93 to 2.11 g/cm$^3$ and meets a condition of $I_D/I_G<0.01$, here, $I_D$ is an intensity of D-peak and $I_G$ is an intensity of G-peak,
wherein the graphene oxide sheets with the average size of more than 100 μm are prepared through following steps of:
(A) diluting a reaction solution of the graphite oxide sheets obtained by Modified-Hummer method through concentrated sulfuric acid, wherein a volume of the concentrated sulfuric acid is 1-10 times of the volume of the reaction solution, and obtaining a filtered product by filtering the reaction solution with a mesh screen;
(B) obtaining a mixture by evenly mixing the filtered product obtained in the step (A) with ice water, and dropwise adding hydrogen peroxide into the mixture till a color of the mixture no longer changes which means that potassium permanganate in the mixture is completely removed;
(C) dropwise adding concentrated hydrochloric acid into the mixture added with hydrogen peroxide obtained in the step (B) till flocculent graphite oxide disappears, and then filtering out graphite oxide crystals through the mesh screen; and
(D) peeling off the graphite oxide crystals by placing the graphite oxide crystals obtained in the step (C) into a shaking table, shocking and washing, thereby obtaining the graphene oxide sheets with the average size of more than 100 μm; and
wherein:
the graphene film comprises multiple layers of planar oriented graphene sheets overlapped with each other through π-π conjugate action, wherein each of the multiple layers of planar oriented graphene sheets has an average size of more than 100 μm, each one to four of a partial of the multiple layers of planar oriented graphene sheets form a graphene structure, wherein a debris content of the graphene sheets with the average size of more than 100 μm by mass is lower than 1%; and
the graphene film has wrinkles on a surface and within an interior thereof.

2. The preparation method of the super-flexible high thermal conductive graphene film according to claim 1, wherein the inorganic salt is ammonium bicarbonate, urea, thiourea, or azodicarbonamide; the small organic molecule is glycerol, polyethylene glycol 200 or polyethylene glycol 400; and the macromolecule is cellulose, gelatin, chitosan, waterborne polyurethane, or acrylic emulsion.

3. The preparation method of the super-flexible high thermal conductive graphene film according to claim 1, wherein the reducing agent is hydrazine hydrate, amines, ascorbic acid, or hydrogen iodide.

4. The preparation method of the super-flexible high thermal conductive graphene film according to claim 1, wherein a pressure and a time in the suppressing step are in a range of 50-200 MP and 6-300 h, respectively.

5. The preparation method of the super-flexible high thermal conductive graphene film according to claim 1, wherein in the step (A), the Modified-Hummer method comprises sufficiently dissolving potassium permanganate in concentrated sulfuric acid with a mass fraction of 98% at $-10°$ C., adding graphite, stirring at a speed of 60 rev/min for 2 h, stopping stirring, reacting for 6-48 h at a low temperature of $-10°$ C. to $20°$ C., and obtaining the reaction solution, wherein a mass volume ratio of the graphite, the potassium permanganate and the concentrated sulfuric acid is 1 g:(2-4) g:(30-40) ml, and a granularity of graphite is larger than 150 μm.

6. The preparation method of the super-flexible high thermal conductive graphene film according to claim 1, wherein the mesh screen is titanium alloy acid-resistant mesh screen.

\* \* \* \* \*